United States Patent [19]

Morita et al.

[11] Patent Number: 5,223,546
[45] Date of Patent: Jun. 29, 1993

[54] HIGH POLYMER NETWORK

[75] Inventors: Kenji Morita; Kohichi Uchiki, both of Nagoya; Hosei Shinoda, Kasugai, all of Japan

[73] Assignee: Mitsui Toatsu Chemicals, Inc., Tokyo, Japan

[21] Appl. No.: 870,336

[22] Filed: Apr. 17, 1992

[30] Foreign Application Priority Data

Apr. 24, 1991 [JP] Japan .................................. 3-94351

[51] Int. Cl.$^5$ ................................................. C08J 9/38
[52] U.S. Cl. ................................ 521/52; 264/288.4; 264/288.8; 264/54; 521/79; 521/182
[58] Field of Search ................ 521/182, 52, 79; 264/54, 288.4, 288.8

[56] References Cited

U.S. PATENT DOCUMENTS

| | | | |
|---|---|---|---|
| 1,995,970 | 3/1935 | Dorough . | |
| 4,181,983 | 1/1980 | Kulkarni | 521/98 |
| 4,702,917 | 10/1987 | Schindler | 521/64 |
| 4,719,246 | 1/1988 | Murdock et al. | 521/182 |
| 4,766,182 | 8/1988 | Murdock et al. | 521/182 |

FOREIGN PATENT DOCUMENTS

| | | |
|---|---|---|
| 171603 | 2/1986 | European Pat. Off. . |
| 51-47170 | 4/1976 | Japan . |
| WO92/01737 | 2/1992 | PCT Int'l Appl. . |

OTHER PUBLICATIONS

WPIL, Week 2289, AN 89-161889 & JP-A-1 104 635 (Taki KK) 21 Apr. 1989.

*Primary Examiner*—Morton Foelak
*Attorney, Agent, or Firm*—Burns, Doane, Swecker & Mathis

[57] ABSTRACT

A degradable polymer network obtained by adding from 0.2 to 10 parts by weight of a foaming agent to 100 parts by weight of a polylactic acid-base resin composition comprising from 80 to 100% by weight of polylactic acid or a lactic acid-hydroxycarboxylic acid copolymer and from 0 to 20% by weight of a plasticizer, conducting melt-foaming extrusion of resulting mixture, and opening the foam cells in the extrudate. The high polymer network is characterized in suitable flexibility and hydrolyzability and thus useful as a material for absorbing oils and body fluids, screens for sunlight, heat-insulating materials, filter media and packaging materials; and does not accumulate as industrial wastes because of hydrolyzability in the natural environment, even though abandoned after use.

16 Claims, No Drawings ns in use.

HIGH POLYMER NETWORK

BACKGROUND OF THE INVENTION

1. Field of the Invention

The present invention relates to a degradable high polymer network, that is, a hydrolyzable high polymer network. More particularly, the invention relates to a hydrolyzable high polymer network comprising a composition essentially consisting of a lactic acid-base polymer which is hydrolyzable in the natural environment.

2. Related Art of the Invention

Conventionally known plastic networks have been prepared by blending an organic or inorganic foaming agent with a general purpose resin based on polyolefin, polyvinyl chloride or polyamide in a specific proportion, conducting extrusion-foaming with a melt-extruding method, generating cells in the extrudate and stretching said extrudate to open said cells.

For example, Japanese Laid-Open Patent Sho 51-47170(1976) has proposed a nonwoven-fiber network obtained by conducting melt-foaming extrusion of a mixture of thermoplastic resin such as polyolefin, polyurethane and polyester with a foaming agent, and opening the extrudate.

The nonwoven-fiber network disclosed in said patent is useful for nonwoven fabrics and adhesive materials and also widely used for absorbing oils and body fluids heat insulating materials, filter media and packaging materials. In these uses, particularly for absorbing oils and body fluids, filter media and packaging materials are generally so-called throw-away uses where these materials are abandoned immediately after use.

However, the nonwoven-fiber network composed of the above resin, that is, the high polymer network has a very slow rate of hydrolysis in the natural environment and remains semipermanently when buried under the ground. Disposal of the network in the ocean causes damage of aesthetics or destruction of the living environment of marine organisms. Thus, disposal of wastes has become a social problem with expansion of consumption.

So far, a high polymer network which can be hydrolyzed in the natural environment has not been known.

Polylactic acid and its copolymer has been known as a thermoplastic and hydrolyzable polymer. These lactic acid-based polymers can be obtained by fermentation of inexpensive materials such as corn starch and corn syrup and can also be prepared from petrochemicals such as ethylene.

U.S. Pat. No. 1,995,970 discloses a preparation process of the lactic acid-base polymer by polymerization of lactic acid, lactide or a mixture of these compounds. The lactic acid-base polymer has been used for surgical sutures and medical slow release matrixes because of good biological compatibility and hydrolyzability. The lactic acid-based polymer, however, is generally high in hardness and hence has a disadvantage of lacking in flexibility when used in the form of a film. Consequently, the lactic acid-based polymer has many restrictions in use.

A high polymer network of a polylactic acid-base resin which is plasticized to provide flexibility, if desired, and can be used for hydrolyzable absorbing materials heat-insulation materials, filter media and packaging materials, has not yet been known.

SUMMARY OF THE INVENTION

One object of the present invention is a high polymer network which is prepared from a high-molecular weight compound and can be sued for absorbing materials, heat insulating materials, filter media and packing materials, to provide a degradable high polymer network comprising a hydrolyzable polymer as the high-molecular weight compound and, if desired, essentially consisting of a plasticized and hydrolyzable polymer.

This object has been accomplished by adding a foaming agent to a polylactic acid-based resin composition containing a specific amount of a lactic acid-based polymer or a mixture of the lactic acid-based polymer and a plasticizer, conducting melt-foaming extrusion, and opening the foam cells to obtain the high polymer network having suitable flexibility and hydrolyzability.

One aspect of the present invention is a high polymer network obtained by adding from 0.2 to 10 parts by weight of a foaming agent to 100 parts by weight of a polylactic acid-based resin composition comprising from 80 to 100% by weight of polylactic acid or a lactic acid-hydroxycarboxylic acid copolymer and from 0 to 20% by weight of a plasticizer, conducting melt-foaming extrusion of resulting mixture, and opening the foam cells in the extrudate, and a process for preparing the same.

The degradable high polymer network of the invention comprises the resin composition essentially consisting of the lactic acid-based polymer, develops fibrous branches to form mesh structure, is a porous, opened and nonwoven fabric-like article, and is characterized in having hydrolyzability.

The high polymer network of the present invention is prepared by adding the foaming agent to the resin composition essentially consisting of the lactic acid-based polymer, mixing with a ribbon blender, melt-kneading the resulting mixture with a single- or twin-screw extruder, delivering through the slit of a ring or flat die in the foam of molten foam and opening the extrudate by stretching with simultaneous cooling in the air or other gases. The high polymer network thus obtained can be further stretched and heat-treated.

The degradable high polymer network of the invention is characterized in hydrolyzability and additionally has suitable flexibility. Consequently, the network is useful as a material for absorbing oils and body fluids, light screening and heat-insulating materials, filter media and packaging materials. The network is hydrolyzed in the natural environment in the case of discarding after use and hence does not accumulate as industrial wastes. Further, ocean disposal of the network does not cause destruction of the living environment of marine organisms.

DETEILED DESCRIPTION OF THE INVENTION

The lactic acid-based polymer of the present invention is polylactic acid or a copolymer of lactic acid and hydroxycarboxylic acid. Exemplary hydroxycarboxylic acids include glycolic acid, hydroxybutyric acid, hydroxyvaleric acid, hydroxypentanoic acid, hydroxycaproic acid and hydroxyheptanoic acid. Preferred hydroxycarboxylic acid is glycolic acid and hydroxycaproic acid.

A preferred molecular structure of polylactic acid is composed of from 85 to 100% by mole of a L-lactic acid unit or D-lactic acid unit and from 0 to 15% by mole of the antipode unit of each lactic acid. The copolymer of lactic acid and hydroxycarboxylic acid is composed of from 85 to less than 100% by mole of a L-lactic acid unit or D-lactic acid unit and less than 15% by mole of a hydroxycarboxylic acid unit.

The lactic acid-based polymer can be prepared by selecting the raw material monomer required by obtaining a desired polymer structure from L-lactic acid, D-lactic acid and hydroxycarboxylic acid and carrying out dehydrating polycondensation. The polymer can be preferably prepared by using lactide which is a cyclic dimer of lactic acid, glycolide which is a cyclic dimer of glycolic acid, and caprolactone and carrying out ring-opening polymerization.

The lactide includes L-lactide which is a cyclic dimer of L-lactic acid, D-lactide which is a cyclic dimer of D-lactic acid, meso-lactide obtained by cyclizing dimerization D-lactic acid and L-lactic acid, and DL-lactide which is a racemic mixture of D-lactide and L-lactide. Any of these compounds can be used for the invention. However, preferred main materials are D-lactide, L-lactide, glycolide and caprolactone.

The lactic acid-based polymer which is preferably used for the invention is polylactic acid which is composed of from 85 to 100% by weight of a L-lactic acid unit or D-lactic acid unit and from 0 to 15% by mole of the antipode unit of each lactic acid, or a copolymer of lactic acid and hydroxycarboxylic acid which is composed of from 85 to less than 100% by mole of a L-lactic acid unit or D-lactic acid unit and less than 15% by mole of a hydroxycarboxylic acid unit.

The lactic acid-base polymer includes, for example, those prepared by the following processes ① to ⑥.

① About 85% by mole or more of L-lactide is copolymerized with about 15% by mole or less of D-lactide, glycolide or a combination of D-lactide and glycolide.

② About 85% by mole or more of D-lactide is copolymerized with about 15% by mole or less of L-lactide, glycolide or a combination of D-lactide and glycolide.

③ About 70% by mole or more of L-lactide is copolymerized with about 15% by mole or less of DL-lactide and about 15% by mole or less of glycolide.

④ About 70% by mole or more of L-lactide is copolymerized with about 15% by mole or less of meso-lactide and about 15% by mole or less of glycolide.

⑤ About 70% by mole or more of D-lactide is copolymerized with about 15% by mole or less of DL-lactide and about 15% by mole or less of glycolide.

⑥ About 70% by mole or more of D-lactide is copolymerized with about 15% by mole or less of meso-lactide and about 15% by mole or less of glycolide.

Thus, the lactic acid-based polymer having various types of molecular structure which can be used for the invention can be prepared by combining prescribed ranges of raw material monomers.

The lactic acid-based polymer has preferably a high molecular weight. The inherent viscosity of the polymer at 25° C. in a chloroform solution having a concentration of 0.5 g/dl is preferably 1~10, more preferably 3~7.

When the inherent viscosity is less than 1, melt viscosity is too low, the polymer causes drooling form the die slit of the extruder and thus processing becomes difficult. Additionally, the product thus obtained is very brittle and difficult to handle. On the other hand, an inherent viscosity exceeding 10 causes too high melt viscosity and unfavorably gives adverse effects on the melt extrudability of the polymer.

Catalysts are preferably used in order to obtain a high molecular weight polymer within a short time by the polymerization of lactide or copolymerization of lactide and glycolide.

The polymerization catalysts which can be used are various compounds capable of exhibiting a catalytic effect on the polymerization reaction. Exemplary catalysts include stannous octoate, tin tetrachloride, zinc chloride, titanium tetrachloride, iron chloride, boron trifluoride ether complex, aluminum chloride, antimony trifluoride, lead oxide and other polyvalent metal compounds. Tin compounds and zinc compounds are preferably used. Stannous octoate is particularly preferred in these tin compounds. The amount is preferably in the range of from 0.001 to 0.1% by weight for the weight of lactide or the total weight of lactide and glycolide.

Known chain extenders can be used for the polymerization. Preferred chain extenders are higher alcohols such as lauryl alcohol and hydroxy acids such as lactic acid and glycolic acid. The polymerization rate increases in the presence of a chain extender and the polymer can be obtained within a short time. The molecular weight of the polymer can also be controlled by varying the amount of the chain extender. However, too much amount of the chain extender tends to decrease the molecular weight of the polymer formed. Hence, the amount of the chain extender is preferably 0.1% by weight or less for lactide or for the total weight of lactide and glycolide.

Polymerization or copolymerization can be carried out in the presence or absence of a solvent. Bulk polymerization in a molten state of lactide or glycolide is preferably carried out in order to obtain a high molecular weight polymer.

In the case of molten polymerization, the polymerization temperature may be generally above the melting point (around 90° C.) of the monomer, lactide or glycolide. In the case of solution polymerization which uses solvents such as chloroform, polymerization can be carried out at a temperature below the melting point of lactide or glycolide. In any case, a polymerization temperature above 250° C. is unfavorable because decomposition of the formed polymer develops.

The polylactic acid-based resin composition of the invention comprises from 80 to 100% by weight of the above lactic acid-based polymer and from 0 to 20% by weight of a plasticizer. An amount of the plasticizer exceeding 20% by weight gives adverse effect on the melt-extrudability of the resin composition and impairs processing ability in the foaming and opening steps. The mechanical strengths of the polymer network thus obtained is also unfavorably decreased.

The plasticizers which can be used include, for example, di-n-octyl phthalate, di-2-ethylhexyl phthalate, dibenzyl phthalate, di-iso-octyl phthalate and other phthalic acid derivatives, di-n-butyl adipate, dioctyl adipate and other adipic acid derivatives; di-n-butyl maleate and other maleic acid derivatives; tri-n-butyl citrate and other citric acid derivatives; monobutyl itaconate and other itaconic acid derivatives; butyl oleate and other oleic acid derivatives; glycerol monoricinoleate and other ricinoleic acid derivatives; tricresyl phosphate, trixylenyl phosphate and other phosphoric acid esters; lactic acid, straight chain lactic acid oligomer, cyclic lactic acid oligomer and lactide. These plasticizers can be used singly or as a mixture. In these plasticizers, lactic acid, straight chain lactic acid oligomer, cyclic lactic acid oligomer and lactide are preferably used in view of plasticizing effect. Lactic acid oligomers used for the plasticizer can be prepared with ease by hot-dehydrating condensation of lactic acid at 50° to 280° C. The oligomer thus obtained usually has a polymerization degree in the range of from 1 to 30. The oligomer can also be preparated by heating glycolide or lactide at 50° to 280° C. in the presence of water and glycolic acid or lactic acid. The oligomer also includes lactide, i.e., cyclic dimer of lactic acid which is used as a monomer in the preparation of lactic acid-based polymer.

The lactic acid-based polymer is effectively plasticized by the addition of the plasticizer and resulting resin composition becomes flexible. When the amount of the plasticizer is 5% by weight or more, flexibility can be clearly observed. However, an amount exceeding 20% by weight gives adverse effect on the melt-extension, foaming and opening of the resin composition and unfavorably decreases mechanical strength of the network obtained.

The plasticizer is blended with the lactic acid-based polymer by dissolving the polymer in a solvent such as chloroform, methylene chloride, toluene or xylene, or heat-melting the polymer at 100° to 280° C., and thereafter adding and mixing a prescribed amount of the plasticizer.

Lactic acid or lactic acid oligomer including lactide which is a preferred plasticizer is mixed, for example, by the following methods:

(a) Polymerization of lactide or copolymerization of lactide and glycolide is stopped before completion to leave unreacted lactide.
(b) After completing polymerization of lactide or copolymerization of lactide and glycolide, a prescribed amount of lactic acid or a lactic acid oligomer including lactide is added and mixed. Methods (a) and (b) can be incorporated.

In the method (a), unreacted lactide is uniformly mixed with the lactic acid-based polymer on microscopic observations and exhibits good plasticizing performance. Reaction of monomer (lactide) is started by heating in the presence of a catalyst, in the coexistence of a chain extender, if desired, and stopped by finishing the heating at the time when the residual monomer concentration is reached to a prescribed level. The amount of residual monomer in the resulting lactic acid-based polymer can be determined by gas chromatographic analysis or thermogravimetric analysis.

In the method (b), after finishing polymerization, the resulting lactic acid-based polymer is dissolved in a solvent such as chloroform, methylene chloride, toluene and xylene, or heat-melted at temperature of from 100° to 280° C. and successively a prescribed amount of lactic acid or the lactic acid oligomer is added and mixed. The method has an advantage of readily controlling the amount of lactic acid or the lactic acid oligomer in the resin composition.

The polylactic acid-based resin composition obtained above is compression-molded or melt-extruded at temperature of 180° to 280° C. into films, sheets or bars. These molded articles are cooled to about −20° C. with dry ice-methanol and crushed with a hammer mill. Alternatively, the resin composition can also be melt-extruded into a strand and cut into pellets.

The high polymer network of the invention is prepared by mixing the foaming agent with the above-obtained polylactic acid-based resin composition, melt-kneading the resulting mixture with a single- or twin-screw extruder, delivering through a ring or flat die in the form of molten foam and opening the extrudate.

Practical method of preparation will hereinafter be illustrated in detail.

First of all, a foaming agent is mixed with the above-obtained polylactic acid-based resin composition.

Exemplary foaming gents which can be used include organic foaming agents such as azoisobutyrodinitrile, diazoaminobenzene, 1,3-bis(p-xenyl)triazine and azodicarbonamide; and inorganic foaming agents such as a mixture of ammonium oxalate and oxalic acid, a mixture of sodium hydrogen carbonate and oxalic acid, ammonium hydrogen oxalate and a mixture of ammonium carbonate and sodium nitrite. These organic and inorganic foaming gents have a decomposition point lower than the extrusion temperature of the resin composition.

Other foaming agents which can be used include, for example, volatile solvents such as acetone, methyl ethyl ketone, ethyl acetate, methyl chloride, ethyl chloride, chloroform, methylene chloride and methylene bromide; and compounds which are gaseous at room temperature such as nitrogen, carbon dioxide, ammonia, methane, ethane, propane, ethylene, propylene and gaseous halogenated hydrocarbons.

Amount of the foaming agent differs depending upon the desired network and the kind of the foaming agent and is generally from 0.2 to 10 parts by weight for 100 parts by weight of the polylactic acid-based resin composition.

An amount less than 0.2 parts by weight leads to a low ratio of foam expansion and makes opening difficult. On the other hand, an amount exceeding 10 parts by weight gives adverse effect on the extrudability of the resin composition and additionally is unfavorable in economy.

Blending of the polylactic acid-based resin composition and the foaming agent can be carried out by common mixing methods with a ribbon blender or conical blender. Mixing is conducted under conditions so as to obtain a uniform mixture of the polylactic acid-based resin composition and the foaming agent. Mixing is preferably carried out at room temperature for 5 to 30 minutes.

The mixture of the polylactic acid-based resin composition and the foaming agent is successively melt-extruded with a common single- or twin-screw extruder. Extrusion temperature is preferably in the range of from 100° to 270° C., more preferably in the range of from 130° to 250° C. An extrusion temperature lower than 100° C. makes extrusion unstable and tends to cause overload. On the other hand, an extrusion temperature higher than 270° C. is unfavorable because decomposition of the lactic acid-based polymer becomes violent.

The extruder die used has a ring or flat slit. The temperature range of the die is about the same as the extruding temperature.

The mixture of the polylactic acid-based resin composition and foaming agent is delivered form the extruder die in the form of molten foam. The molten foam is stretched immediately after delivery while cooling with a blowing gas such as the air having temperature of 10° to 50° C. and thereby foam cells are opened to form a network as a result of splitting foam cells existing in the molten foam. The resulting network is solidified on the take-off rolls having a surface temperature of 10° to 50° C. and is successively wound up. The take-off speed by the take-off rolls is adjusted so as to obtain a draft ratio of from 10 to 500. It is unfavorable outside the above range because good opening cannot be achieved.

The most suitable gas for use in cooling the molten foam delivered from the extruder is the air in view of economy and ease of handling. Other gases such as nitrogen and carbon dioxide are also preferred. The amount of the cooling gas is preferably in the range of 1 to 15 m³ per square meter of the network. An amount less than 1 m³ leads to insufficient cooling effect and good opening cannot be obtained. On the other hand, an amount exceeding 15 m³ increases the cooling rate of the extrudate and it is unfavorable because the molten foam sometimes solidifies before splitting the generated foam cells. Stretching while cooling the molten foam to the above temperature range with the air or other gases can provide a network having good opening. Unless stretching with simultaneous cooling to the above temperature range is conducted, the molten foam of the polylactic acid-based resin composition is difficult to conduct opening because of a drooling tendency. Even through the die temperature is retained relatively low to increase melt viscosity of the resin composition, irregular opening is obtained.

In order to increase the expansion ratio of the molten foam, it is favorable to increase the amount of foaming agents or to delay the timing for cooling the molten foam delivered from the die. In the case of decreasing the expansion ratio, it is favorable to carry out the contrary.

The degree of opening can be controlled by the degree of stretching for the molten foam delivered from the die. The degree of stretching is usually from 1.5 to 5 times the length of the molten foam immediately after delivery from the die.

The polylactic acid-based resin composition of the invention can contain colorants, fillers and reinforcements in addition to the foaming agents as long as these additives do not impair the object of the invention.

The high polymer network thus obtained can be further stretched and heat-treated.

The present invention will hereinafter be illustrated further in detail by way of examples.

Following evaluation methods were used in the examples.

① Amount of residual monomer

After finishing the polymerization reaction, the reaction mixture was dissolved in hexafluoroisopropanol (hereinafter referred to as HFIP) or methylene chloride to obtain a solution having known concentration. Residual monomer was determined by gas chromatography.

② Inherent viscosity

A lactic acid-based polymer is dissolved in chloroform (concentration; 0.5 g/dl), viscosity of the resulting solution was measured at 25°±0.5° C. with a Ubbelohde viscometer, the inherent viscosity > was calculated from the following equation.

$$> = \log(T_1/T_0)/C$$

wherein
$T_0$: Measuring time of the solvent (sec)
$T_1$: Measuring time of the solution (sec)
C: Concentration of the sample solution (g/dl).

③ State of opening

Good: Foam structure was opened into a fibrous fine network structure
Poor: Three or more unopened portions having a size of 5 mm ore more were found in an area of 100 cm², or five or more unopened portions having a size of 30 mm or more were found in an area of 1 m².

④ Basis weight

Weight of a specimen having dimensions 5×5 cm was measured and converted to weight per/m². The value thus obtained was defined as basis weight (g/m²).

⑤ Stiffness

A specimen having a width of 20 mm was set on a tensile tester so as to give a measuring length (grip distance) of 50 mm and stretched to the direction of winding-up at a pulling rate of 50 mm/min to obtain a stress-strain curve. A tangent line at the initial rising portion of the stress-strain curve was extrapolated to obtain a load at an elongation of 100%. Stiffness was calculated from the following equation.

$$\text{Stiffness (kgf·m/g)} = 100 \times R \times 1/W \times 1/M$$

wherein
R: Load(kgf) at 100% elongation
W: Width of specimen (cm)
M: Basis weight (g/m²).

⑥ Polymerization degree of oligomer

An oligomer was dissolved in tetrahydrofuran or chloroform, distribution of the polymerization degree was measured by gel permeation chromatography (GPC) to calculate the polymerization degree of the oligomer.

PREPARATION EXAMPLE

To a reaction vessel, 1.8 kg of L-lactide and 1.0 kg of an aqueous lactic acid solution having a concentration of 87% by weight were charged and heated for 2 hours at 100° C. The reaction mixture was cooled to the room temperature. A viscous transparent liquid was obtained. As a result of GPC analysis, the liquid contained lactic acid and a lactic acid oligomer. An average polymerization degree was 2.8. The product was hereinafter referred to as LA-oligomer.

EXAMPLES 1-15, AND COMPARATIVE EXAMPLES 1-4

Marketed L-lactide (hereinafter referred to as L-LTD), D-lactide (hereinafter referred to as D-LTD), DL-lactide (hereinafter referred to as LD-LTD) and glycolide (hereinafter referred to as GLD) were individually recrystallized 4 times from ethyl acetate.

ε-Caprolactone (hereinafter referred to as CL) was dried over calcium hydride and distilled.

To a glass reaction vessel having a silane-treated internal surface, the above-purified L-LTD, D-LTD, DL-LTD, GLD, CL and a catalyst stannous octoate were respectively charged in an amount illustrated in Table 1. Then the resulting mixture was dried for 24 hours by evacuating the reaction vessel.

The reaction vessel was heated to the prescribed temperature illustrated in Table and polymerization was carried out for the prescribed time. After finishing the reaction, the reaction mixture was discharged from the vessel. The lactic acid-based polymers thus-obtained were referred to as P.1∼P6.

The inherent viscosity and residual monomer content were measured and results are illustrated in Table 1.

TABLE 1

|  | P1 | P2 | P3 | P4 | P5 | P6 |
|---|---|---|---|---|---|---|
| L-LTD (wt. parts) | 100 | 70 | 95 | 75 | 50 | 80 |
| D-LTD (wt. parts) | — | 30 | — | 20 | 50 | — |
| DL-LTD (wt. parts) | — | — | 5 | — | — | — |
| GLD (wt. parts) | — | — | — | 5 | — | — |
| CLD (wt. parts) | — | — | — | — | — | 20 |
| Catalyst (wt. %) | 0.015 | 0.015 | 0.015 | 0.015 | 0.015 | 0.015 |
| Polymerization time (hr) | 110 | 120 | 110 | 120 | 125 | 120 |
| Polymerization temperature (°C.) | 160 | 120 | 40 | 120 | 100 | 140 |
| Inherent viscosity | 4.2 | 6.1 | 3.8 | 5.1 | 5.4 | 4.3 |
| Residual monomer (wt. %) | 1.3 | 0.9 | 13.1 | 1.1 | 1.5 | 1.9 |

Next, L-LTD or LA-oligomer obtained in Preparation Example was added to these lactic acid-based polymers in a proportion illustrated in Table 2, mixed with a plastomill at temperature illustrated in Table 2 to obtain polylactic acid-based resin compositions C1 to C8.

These resin compositions were pressed under the pressure of 100 kg/cm² at the temperature illustrated in Table 2 to obtain a sheet having a thickness of 1 mm.

TABLE 2

|  | C1 | C2 | C3 | C4 | C5 | C6 | C7 |
|---|---|---|---|---|---|---|---|
| Lactic acid-based polymer (wt. %) | P1 80 | P2 90 | P2 80 | P2 90 | P4 80 | P5 90 | P6 90 |
| Additive (wt. %) | LA-oligomer 20 | LA-oligomer 10 | LTD-monomer 20 | LA-oligomer 10 | LA-oligomer 20 | LTD-monome 10 | LA-oligomer 10 |
| Melt-blending temperature (°C.) | 210 | 150 | 150 | 150 | 150 | 130 | 130 |
| Press temperature (°C.) | 210 | 150 | 150 | 150 | 150 | 130 | 130 |

The polylactic acid-based resin composition illustrated in Table 3 was cooled with liquid nitrogen crushed with a hammer mill, and followed by adding a foaming agent azodicarboxylic acid amide in a proportion illustrated in Table 3 and mixing with a ribbon blender at room temperature.

The mixture thus obtained was melt-kneaded with a single screw extruder having a diameter of 19 mm at the extrusion temperature illustrated in Table 3 and delivered through a T-die slit having a width of 150 mm at the temperature illustrated in Table 3 at the output rate of 30 g/min in the form of molten foam or solid extrudate. The molten foam was stretched immediately after delivery from the T-die with simultaneous cooling by blowing the air at the room temperature in a air-flow rate illustrated in Table 3. At the same time, the foam was opened and wound up at a stretching rate of 10 m/min to obtain a high polymer network.

State of opening, basis weight and stiffness as a measure of flexibility were evaluated.

The results are illustrated in Table 3.

TABLE 3

|  | Resin Composition | Forming agent | (wt. %) | Extrusion temperature (°C.) | Air-flow rate (m³/min) |
|---|---|---|---|---|---|
| Example 1 | P1 | A | 0.2 | 230 | 0.1 |
| Example 2 | P2 | B | 1.0 | 150 | 0.1 |
| Example 3 | P3 | B | 5.0 | 180 | 0.1 |
| Example 4 | P5 | C | 1.0 | 130 | 0.1 |
| Example 5 | P6 | C | 1.0 | 130 | 0.1 |
| Example 6 | C1 | A | 1.0 | 210 | 0.1 |
| Example 7 | C2 | B | 1.0 | 150 | 0.1 |
| Example 8 | C2 | B | 1.0 | 150 | 0.1 |
| Example 9 | C2 | B | 1.0 | 150 | 0.1 |
| Example 10 | C3 | B | 0.2 | 150 | 0.1 |
| Example 11 | C4 | B | 1.0 | 150 | 0.1 |
| Example 12 | C5 | B | 5.0 | 150 | 0.1 |
| Example 13 | C5 | C | 1.0 | 130 | 0.1 |
| Example 14 | C7 | C | 1.0 | 130 | 0.1 |
| Comparative Example 1 | P1 | A | 0 | 230 | 0.1 |
| Comparative Example 2 | P1 | A | 1.0 | 230 | 0 |
| Comparative Example 3 | C2 | B | 0.1 | 150 | 0.1 |
| Comparative Example 4 | C2 | B | 15 | 150 | 0.1 |

|  | Basis weight (g/m³) | State of opening | Stiffness (kgf · m/g) | Remark |
|---|---|---|---|---|
| Example 1 | 21.2 | good | 268 |  |
| Example 2 | 20.1 | good | 211 |  |
| Example 3 | 18.7 | good | 193 |  |
| Example 4 | 21.4 | good | 130 |  |
| Example 5 | 22.1 | good | 127 |  |
| Example 6 | 23.2 | good | 234 |  |
| Example 7 | 21.3 | good | 129 |  |
| Example 8 | 23.2 | good | 154 |  |
| Example 9 | 18.1 | good | 131 |  |
| Example 10 | 21.1 | good | 143 |  |
| Example 11 | 20.2 | good | 158 |  |
| Example 12 | 20.1 | good | 131 |  |
| Example 13 | 22.7 | good | 84 |  |
| Example 14 | 23.1 | good | 64 |  |
| Comparative Example 1 | 30.1 | — | 631 | film |
| Comparative Example 2 | 30.1 | poor | — | irregular opening |
| Comparative Example 3 | — | poor | — | irregular opening |
| Comparative Example 4 | — | — | — | poor output |

As a result of evaluation in practical use, the high polymer network obtained could be favorably used for wiping off edible oils. Cotton and feathers can also be wrapped or collected without impairing breathing property. The network could be favorably used as a trash bag having good hydro-extraction for wet refuse of household kitchen. In cases for using as packaging underlayers for meat and raw fish, fluids such as flood could be absorbed. The network was also suited for wrapping the root of garden trees and shading the sunlight, and also favorably applied to a filter of a ventilation system.

The high polymer networks obtained in Examples 1, 2 and 5 and a high polymer network of polyolefin resin (Neu Netz U; Trade Mark of Mitsui Toatsu Chemicals Inc.) were respectively immersed in distilled water at 37° C. After 30 days, weight loss was 9%, 17%, 27%, and 0%, respectively.

What is claimed is:

1. A degradable high polymer network having mesh structure comprising fibrous branches of polylactic acid or a lactic acid-hydroxycarboxylic acid copolymer.

2. The degradable high polymer network of claim 1 wherein the polylactic acid essentially consists of an L-lactic acid unit or a D-lactic acid unit.

3. The degradable high polymer network of claim 1 wherein the polylactic acid comprises from 85 to less than 100% by mole of an L-lactic acid unit and less than 15% by mole of a D-lactic acid unit.

4. The degradable high polymer network of claim 1 wherein the polylactic acid comprises from 85 to less than 100% by mole of a D-lactic acid unit and less than 15% by mole of an L-lactic acid unit.

5. The degradable high polymer network of claim 1 wherein the lactic acid-hydroxycarboxylic acid copolymer comprises from 85 to less than 100% by mole of an L-lactic acid unit and less than 15% by mole of a glycolic acid unit.

6. The degradable high polymer network of claim 1 wherein the lactic acid-hydroxycarboxylic acid copolymer comprises from 85 to less than 100% by mole of a D-lactic acid unit and less than 15% by mole of a glycolic acid unit.

7. A degradable high polymer network having mesh structure comprising fibrous branches of the high polymer and obtained by the process comprising adding from 0.2 to 10 parts by weight of a foaming agent to 100 parts by weight of a polylactic acid-base resin composition comprising from 80 to 100% by weight of polylactic acid or a lactic acid-hydroxycarboxylic acid copolymer and from 0 to 20% by weight of a plasticizer, conducting melt-foaming extrusion of resulting mixture, and opening the foam cells in the extrudate.

8. The degradable high polymer network of claim 7 wherein the polylactic acid essentially consists of an L-lactic acid unit or a D-lactic acid unit.

9. The degradable high polymer network of claim 7 wherein the polylactic acid comprises from 85 to less than 100% by mole of an L-lactic acid unit and less than 15% by mole of a D-lactic acid unit.

10. The degradable high polymer network of claim 7 wherein the polylactic acid comprises from 85 to less than 100% by mole of a D-lactic acid unit and less than 15% by mole of an L-lactic acid unit.

11. The degradable high polymer network of claim 7 wherein the lactic acid-hydroxycarboxylic acid copolymer comprises from 85 to less than 100% by mole of an L-lactic acid unit and less than 15% by mole of a glycolic acid unit.

12. The degradable high polymer network of claim 7 wherein the lactic acid-hydroxycarboxylic acid copolymer comprises from 85 to less than 100% by mole of a D-lactic acid unit and less than 15% by mole of a glycolic acid unit.

13. The degradable high polymer network of claim 12 wherein the plasticizer is lactic acid, a lactic acid oligomer or lactide.

14. The degradable high polymer network of claim 12 wherein the foaming agent is azodicarboxylic acid amide.

15. The degradable high polymer network of claim 7 wherein the plasticizer is lactic acid, a lactic acid oligomer or lactide.

16. The degradable high polymer network of claim 7 wherein the foaming agent is azodicarboxylic acid amide.

* * * * *

UNITED STATES PATENT AND TRADEMARK OFFICE
CERTIFICATE OF CORRECTION

PATENT NO. : 5,223,546

DATED : June 29, 1993

INVENTOR(S) : Morita et al

It is certified that error appears in the above-identified patent and that said Letters Patent is hereby corrected as shown below:

Column 7, line 59, amend ">>" to -- $\eta$ --;

line 62, amend ">" to -- $\eta$ --.

Signed and Sealed this

Third Day of May, 1994

BRUCE LEHMAN

*Attest:*

*Attesting Officer*          Commissioner of Patents and Trademarks